Patent 2,698,252 — Dec. 28, 1954

2,698,252

LIME-FLY ASH COMPOSITIONS FOR STABILIZING FINELY DIVIDED MATERIALS SUCH AS SOILS

Jules E. Havelin, Havertown, and Frank Kahn, Philadelphia, Pa.

No Drawing. Application August 18, 1951, Serial No. 245,652

7 Claims. (Cl. 106—120)

This invention relates to compositions for effecting the stabilization of finely divided materials such as soils and the like, and more particularly relates to compositions whereby substantially chemically inert fine mineral materials are stabilized by treatment with lime and fly ash.

This application is a continuation-in-part of our copending application, Ser. No. 36,048, filed June 30, 1948, entitled "Hydrated Lime Fly Ash Fine Aggregate," now U. S. Patent No. 2,564,690, issued October 21, 1951. In the aforesaid co-pending application we have disclosed cementitious compositions useful as mortars and the like which contain fine aggregate in the form of finely divided sand or other chemically inert aggregate having a fineness modulus of 1.7 or above. Repeated experiments in the laboratory as well as practical applications in the field have demonstrated that, within specific ranges of relative proportions of those ingredients, a mixture having unexpectedly high early compressive strength was obtained.

We have now discovered that unexpected advantages are attained by mixing lime and fly ash in controlled proportions with a finely divided soil having a fineness modulus less than 1.7. We have further found that, for certain soils of fineness modulus below 1.7, certain optimum relative proportions of lime and fly ash give unexpected peaks when soil characteristics relating to durability and bearing power of the soil are plotted against percentage. For example, the plasticity index, shrinkage characteristics, water retentivity and capillary potential of uncured samples as well as modulus of elasticity, unconfined compressive strength and resistance to alternate cycles of freezing and thawing and wetting and drying of cured specimens vary critically within definite ranges for definite soils. These materials are of such fineness that they are outside the class of materials usually referred to as aggregates. The compositions of this invention are extremely useful for many purposes and are found particularly useful in the field of soil stabilization for building load-supporting surfaces such as air field runways, roads, highways or the like.

Certain materials which have previously been suggested for other purposes wholly unrelated to soil stabilization involve the incorporation of lime with fly ash, as exemplified by the U. S. patent to Peffer, No. 1,942,769, issued January 9, 1934. Peffer's compositions do not include finely divided materials such as soils or the like and are necessarily indurated, or subjected to the action of heat, in order to cause a chemical interaction between the lime and the fly ash. Such induration ordinarily involves intimate contact with steam, which would be difficult if not impossible to accomplish in building roads or highways. Moreover any process involving induration would be excessively costly and of no practical merit whatsoever in road or highway building operations.

Another prior patent, issued to Jones and Swezey (U. S. Patent No. 2,382,154, August 14, 1945), discloses a building block or brick comprising lime, fly ash, and certain aluminosilicic acid materials such as shales, slates and clays. However, substantial proportions of lime, on the order of 40% lime, far in excess of the proportions of lime in applicants' compositions, are included in the Jones and Swezey composition, and this has a profound effect on the properties and character of the final composition as well as its cost.

The development of the field of soil stabilization is of increasing importance in construction of roads, highways and the like. Such stabilized soils are effectively utilized to form load-supporting bases, by which we mean base courses under highways and roads, and for road shoulders, secondary roads, parking areas, airport runways and the like. Several different compositions are being developed for stabilization of roads and highways, the construction of which is one of the largest industries in the United States. One soil stabilization composition involves the admixture of bituminous materials such as road oils, tars, emulsions and the like with the soil. Certain soils have been stabilized by mixing with lime, or with bitumin-hydrated lime compositions. Portland cement has also been employed for soil stabilization, as well as various other materials such as organic resins, calcium chloride and various proprietary materials. However, these materials have not exhibited certain advantageous properties peculiar to this invention, and in most instances are relatively expensive as compared with our compositions. A further disadvantage in connection with the use of Portland cement is that the cement component of the soil mixture sets quite rapidly and it is therefore necessary for persons using the mixture to adhere closely to time schedules in forming the soil mixtures and in finishing the stabilized mixture.

The surfacing of airport runways has presented difficulties in that the jets of jet propelled airplanes using the runways are frequently directed against the runway surface. The surface temperature is almost instantly brought to a value sufficient to cause spalling of concrete and cement-like surfacing materials. On the other hand, bituminous materials such as asphalt and oil-treated aggregates are inadequate surfacing materials for airport use since the bituminous content of the surface immediately burns under the intense heat of the jet.

The primary object of the invention is to provide economical compositions for stabilizing soil to convert it to a composition well suited as a construction material for use in roads, highways and the like.

Another object of the present invention is to provide stabilized fine mineral material having high compressive strength. Still another object of the invention is to provide a stabilized soil or equivalent fine material having superior durability, wetting and drying resistance, freezing and thawing resistance, and weathering resistance.

Another object is to provide compositions for converting soils which have high plasticity, excessive shrinkage and poor drainage characteristics to composition having low plasticity index and improved dimensional stability and drainage properties.

Still another object of the invention is to provide a composition of matter for incorporation into a finely divided inert material with capacity to form a stabilized mixture having modified and improved engineering characteristics.

Still another object of the invention is to provide a relatively inexpensive solid mixture which, when incorporated into finely divided soil or equivalent mineral having a fineness modulus less than 1.7, in the presence of moisture, will form a stabilized mixture having resistance to intense heat and other radiaclly modified and improved engineering characteristics.

Further objects and advantages of the invention will further become apparent hereinafter.

The foregoing and other objects are attained in accordance with this invention by providing a mix comprising lime, fly ash, and a finely divided soil, said soil having a fineness modulus less than 1.7.

As used throughout this specification and claims the term "lime" is used to indicate quicklime, hydrated lime, and slaked lime. The term "hydrated lime" indicates a dry powder obtained by treating quicklime with water enough to satisfy its chemical affinity for water under the conditions of its hydration. It consists essentially of calcium hydrate or a mixture of calcium hydrate and/or magnesium oxide and/or magnesium hydroxide. In the above definition quicklime is used to indicate a calcined material the major portion of which is calcium oxide (or calcium oxide in natural association with a lesser amount of magnesium oxide) capable of slaking with water. The term "slaked lime" is used interchangeably with "hydrated lime." Both hydrated lime and slaked lime may be associated with excess water, resulting in a moist or slurried state or condition.

The term "fly ash" as used in the present specification is intended to indicate the finely divided ash residue produced by the combustion of pulverized coal, which ash is carried off with the gases exhausted from the furnace in which the coal is burned and which is collected from these gases usually by means of suitable precipitation apparatus such as electrical precipitators. The fly ash so obtained is in a finely divided state such that at least about 70% passes through a 200 mesh sieve. The fly ash collected from the exhaust gases is hereinafter referred to as crude fly ash.

The term "soil" is used throughout this specification and the claims hereof is intended to indicate natural or artificial substantially inorganic materials having a fineness modulus below 1.7. While we designate these materials as "inorganic," the presence of minor proportions of organic materials is not excluded, provided the fine material is predominantly inorganic.

By "fineness modulus" we refer to a standard particle size designation determined by sieve analysis. The standard sieves employed are ⅜ inch, No. 4 sieve (4760 micron), No. 8 sieve (2380 micron), No. 16 sieve (1190 micron), No. 30 sieve (590 micron), No. 50 sieve (297 micron), and No. 100 sieve (149 micron). Fineness modulus of a material is determined by adding the total percentages retained on each of the specified sieves and dividing the sum by 100.

Our invention embraces a wide variety of naturally occurring soils which have a fineness modulus below 1.7. Such soils are well classified in accordance with the Public Roads Administration classification into seven groups identified as Group A-1 through A-7, with subgrouping under A-1, A-2 and A-4. The principal groups covered in accordance with this invention, and as defined in Bulletin 39 of the Commonwealth of Pennsylvania Department of Highways, June 1948, are Groups A-4 through A-7, and A-2-4 through A-2-7, as well as certain A-3 soils having fineness modulus below 1.7. Group A-4 soils are non-plastic or moderately plastic silty soils usually having a high percentage passing the No. 200 sieve. The group includes also mixtures of fine silty soil and up to 64% sand and gravel retained on the No. 200 sieve. These soils ordinarily contain small amounts of colloidal clay. In performance as sub-grade material, Group A-4 soils of themselves are subject to objection in that they are difficult to compact, are subject to frost heaving, and have undesirable elasticity (or poor compressibility) and volumetric shrinkage characteristics.

Group A-5 soils are micaceous and diatomaceous materials, are finely divided, and are subject to the principal objections noted above in connection with A-4 soils. They are particularly objectionable as sub-grade materials by reason of their elasticity and instability.

Group A-6 soils are essentially plastic clay soils usually having 75% or more passing the No. 200 sieve. Similarly Group A-7 soils are clayey materials and exhibit undesirable elasticity as well as volumetric shrinkage. A-6 and A-7 soils are generally regarded as poor subgrade materials for road and highway construction. The aforementioned Bulletin 39, on page 9 thereof, indicates that the A-4, A-5, A-6, and A-7 soils are silty and clayey, all being characterized by the fact that at least 36% by weight of the soil passes a standard No. 200 sieve.

Sub-groups A-2-4 and A-2-5 include gravels or coarse sands having fineness moduli above 1.7 but also include fine sands having fineness moduli below 1.7 which are effectively stabilized in accordance with this invention. The aforementioned Bulletin 39, on pages 7 and 9 thereof indicates that the A-2-4 and A-2-5 soils are gravels or sands containing a plastic component of clay or silt, and that the A-2-4 soils are characterized by the fact that a maximum of 35% by weight passes a standard No. 200 sieve, and that portion of the soil which passes a standard No. 40 sieve has a maximum liquid limit of 40 and has a maximum plasticity index of 10. The same bulletin similarly identifies A-2-5 soils, with the exception that the minimum liquid limit of the fraction passing a standard No. 40 sieve is 41. Sub-groups A-2-6 and A-2-7 contain sand and gravel together with a clayey binder component and many of these soils have fineness moduli below 1.7 and are advantageously treated in accordance with this invention. On page 9, the aforementioned Bulletin 39 specifies that A-2-6 and A-2-7 soils are characterized by the fact that they are silty and clayey, and that portion of the soil passing a standard No. 40 sieve has a minimum plasticity index of 11. A-3 soils are essentially very fine sands, and those A-3 soils having fineness moduli below 1.7 are within the scope of this invention. Natural A-3 soils, though occasionally considered satisfactory as sub-grade materials in confined spaces, are generally too mobile or lacking in cementitious materials for average use. The aforementioned Bulletin 39, on pages 7 and 9 thereof, indicates that A-3 soils are fine sands having no binder content, at least 51% by weight passing a standard No. 40 sieve, and a maximum of 10% by weight passing a standard No. 200 sieve.

Finely divided materials other than natural soils, which are equivalent to the soils falling within the above defined soil classifications, nevertheless are included within the scope of this invention. These materials include fine sand, stone screenings, slags, gravel screenings, mineral deposits, fine screenings from quarry operations and the like, having fineness modulus below 1.7, as well as other similar soil-like materials all of which are included within the meaning of the term "soils" as used herein.

The relative proportions of the three principal components of the compositions are important, in that a wholly unexpected peak is attained, when certain soil characteristics are plotted against the relative proportions of fly ash and lime in the mix, such peak being of the same general character as that represented in Fig. 2 of our aforementioned copending application. Moreover, optimum results are attained for soils of different types by providing lime-fly ash compositions within critical ranges of different scopes. Thus, while the lime, fly ash and soil of our composition may advantageously be present in amounts by weight within the ranges of about lime 2-9, fly ash about 10-30 and soil about 70-90, very advantageous results are attained in different ranges for different soils, as indicated in the following table:

*Optimum proportions*

| Soil Class | Parts By Weight | | |
| --- | --- | --- | --- |
| | Lime | Fly Ash | Soil |
| A-3 | 2-7 | 15-30 | 70-85 |
| A-2-4 | 2-7 | 10-20 | 80-90 |
| A-2-5 | 2-9 | 10-20 | 80-90 |
| A-2-6 | 3-9 | 10-20 | 80-90 |
| A-2-7 | 3-9 | 10-20 | 80-90 |
| A-4 | 3-9 | 10-20 | 80-90 |
| A-5 | 3-9 | 10-20 | 80-90 |
| A-6 | 3-9 | 10-20 | 80-90 |
| A-7 | 3-9 | 10-20 | 80-90 |

In the ranges shown above, very advantageous results are obtained, with pronounced optimums occurring particularly with respect to the relative percentages of fly ash. Preferably the parts fly ash and soil, as expressed above, total 100.

The advantages and characteristics of these compositions are readily determined by testing samples thereof for plasticity index, resistance to penetration by standard needle, shrinkage characteristics, water retentivity and capillary potential, for example, such characteristics being measurable immediately after the mixture is formed. The stabilized soil mixes which show optimum performance as tested by the above characteristics are found to have the most advantageous properties upon aging or curing as reflected by tests for modulus of elasticity, freezing and thawing resistance, wetting and drying resistance, and unconfined compressive strength.

The plasticity index of soil is conventionally defined as the numerical difference between the liquid limit and the plastic limit of a soil. It indicates the range of moisture content in which the soil is in the plastic, or semi-solid state. The liquid limit is conventionally defined as the water content at which the soil passes from the plastic state to the liquid state, while the plastic limit of a soil is the lowest water content at which a soil becomes plastic, or the content at which a soil changes from a solid state to a semi-solid state. These tests may be carried out in accordance with AASHO Designations T-89-49, T-90-49, and T-91-49.

The volumetric shrinkage of a soil is tested by measuring the volume loss of a soil sample on drying, and may be determined in accordance with AASHO Designation T-92-42.

The water retentivity of a soil is its ability to hold water, and may be determined by applying standard suction to a soil sample of standard size, and measuring the time required for removal of a unit amount of water.

The capillary potential of a soil is the direct measure of the property of the soil to raise water above the free ground water level by capillary action. It is determined by placing a wet soil sample of definite size in the top of a funnel the stem of which contains water. The open bottom of the stem is submerged in a mercury reservoir. Water is permitted to evaporate from the soil surface, the height of the mercury column thus drawn up is measured. Capillary potential is usually expressed in terms of feet of water.

Another important characteristic of stabilized soil, which is measurable after a curing or aging period, is its modulus of elasticity, which is often determined by a conventional dynamic method based upon resonance. The test for modulus of elasticity, or ratio of stress to strain, is of particular importance because many of the other important characteristics of stabilized soil are related to its modulus of elasticity.

The aged or cured stabilized soil specimens may also be tested for capacity to resist alternate cycles of freezing and thawing and/or wetting and drying. The specimen is subjected to successive cycles and the condition of the specimen is observed at the end of each cycle. After each cycle the surface of the specimen is brushed with a wire brush to remove loose particles. The loss in weight is recorded as an indication of the durability and quality of the soil composition.

Another important test which constitutes a definite factor, specifically relating to the proportions of our materials, is the test for unconfined compressive strength. Unconfined compressive strength is measured on unconfined cured and dried samples using conventional testing equipment such as that used for mortars, concrete, and the like. This test conveniently demonstrates the improvement in bearing capacity which is developed by the use of this invention as contrasted with the very low, and in many instances negligible bearing capacity of untreated soil expressed in terms of unconfined compressive strength. In fact, the superior strength developed by this invention improves it beyond the range measurable by the conventional test which involves measurement of deflection under load.

Ingredients of our compositions may be prepared in any conventional manner, such as by simple mixing of the solid components, preferably in the presence of water. However the mixing is preferably carried into effect by breaking up the soil and mixing the soil with lime and fly ash in predetermined proportions, utilizing suitable soil-breaking and mixing equipment such as that conventionally used for farm and construction purposes, with water added to the mixture in an amount substantially equal to that proportion of water known and defined as the optimum moisture content. Optimum moisture content is determined by the well known modified Proctor test.

Optimum moisture content of a soil or stabilized soil mixture is that moisture content at which the soil-moisture mix has the maximum dry density, or maximum dry weight of solids per unit volume. In practice, the optimum water content varies with each particular soil and stabilized soil mixture, ordinarily within the range of 8-25% moisture by weight, based on the total dry weight of lime, fly ash, and soil. Preferably, in incorporating moisture into our stabilized soil mixes, the water content should be controlled within the range of 70%-130% of the optimum water content. Thus the water content of the stabilized road base may vary from about 5%-32% by weight, based on the weight of total lime, fly ash, and soil, for different soils.

After mixing, the soil may be formed to the desired shape, which may be of any desired character. After curing for several weeks it will develop considerable compressive strength, but the cementitious bond of the mix develops so slowly that even after a week, the formed mix can readily be deformed and re-shaped.

The following examples are illustrative of the invention:

Example 1

A soil was selected comprising a clayey sand, fineness modulus below 1.7, secured from the southern part of Maryland, having a relatively high plasticity index of 11.4%. Its Highway Research Board classification was A-2-6. The soil was mixed with lime, fly ash and optimum water, the proportions of solids being as follows:

| | Parts by weight |
|---|---|
| A-2-6 soil | 90 |
| Lime | 9 |
| Fly ash | 10 |

The resulting material at once showed the following properties as contrasted to those of the natural A-2-6 soil:

The plasticity index of 11.4% for the natural soil was reduced to 3.5% for the stabilized soil.

The water retentivity of 8.4 seconds for the natural soil was reduced to 1.5 seconds for the stabilized soil.

The resistance to penetration was increased. A standard needle penetrated the natural soil a depth of .07 mm., while under the same test conditions it penetrated the stabilized soil to a depth of only .025 mm.

Specimens were prepared from the above mixture utilizing moisture at optimum moisture content and compacted and cured for 28 days. These specimens showed an unconfined compressive strength of 300 p. s. i. as contrasted to 20 p. s. i. for the natural soil. Resistance to freezing and thawing and wetting and drying was also radically improved as indicated by a standard wire brush test which showed that the stabilized material stands up after numerous cycles as contrasted to the native soil which fails to stand up for one cycle.

Example 2

Soil description: Plastic clay soil secured from a location north of Hagerstown, Maryland.
Highway Research Board classification: A-7.
Proportions of mixture:

| | Parts by weight |
|---|---|
| A-7 soil | 90 |
| Lime | 9 |
| Fly ash | 10 |

The resulting material at once showed the following properties as constrasted to those of the natural A-7 soil:

The plasticity index of 38.5% for the natural soil was reduced to 4.0% for the stabilized soil.

The volumetric shrinkage of 89% for the natural soil was reduced to 15% for the stabilized soil.

The capillary potential of 17 feet for the natural soil was reduced to 10.2 feet for the stabilized soil.

Specimens of the above mixture, combined with optimum water and compacted and cured for 28 days, showed an unconfined compressive strength of 2000 p. s. i. as contrasted to 700 p. s. i. for the natural soil, and a resistance to alternate cycles of freezing and thawing and wetting and drying for numerous cycles as contrasted to the natural soil which failed in the first cycle.

The dynamic modulus of the cured specimen expressed as the product of the weight of the specimen times the square of the natural frequency was $5.1 \times 10^6$ pounds/sec.$^2$ while that of the natural soil was below $0.1 \times 10^6$ pounds/sec.$^2$.

Example 3

Separate samples were compounded with varying proportions by weight of lime, fly ash, and A-2-6 soils as follows:

| Lime | Fly Ash | Soil (A-2-6) |
|---|---|---|
| 3 | 10 | 90 |
| 6 | 10 | 90 |
| 9 | 10 | 90 |
| 3 | 20 | 80 |
| 6 | 20 | 80 |
| 9 | 20 | 80 |

In the stabilized soil samples as above prepared, the engineering characteristics of the soil were improved as follows, the range being a function of the composition:

|  | Natural Soil | Stabilized Soil |
|---|---|---|
| Plasticity Index | 11.4% | 0-3.5%. |
| Compressive Strength (28 days) | 85 p. s. i. | 200-300 p. s. i. |
| Water retentivity | 8.4 sec. | 1.5 sec. (all samples). |
| Penetration | .07 mm. | .025-.03 mm. |
| Dynamic Modulus | 2.0-4.8×10⁶ lbs./sec.² | Less than 0.1×10⁶ lbs./sec.² |

*Example 4*

Separate samples were prepared in the manner described in Example 3, using an A-7 soil of fineness modulus below 1.7. The soil was effectively stabilized by the action of lime and fly ash, in proportions by weight as follows:

| Lime | Fly Ash | Soil (A-7) |
|---|---|---|
| 3 | 10 | 90 |
| 6 | 10 | 90 |
| 9 | 10 | 90 |
| 3 | 20 | 80 |
| 6 | 20 | 80 |
| 9 | 20 | 80 |

The comparative engineering characteristics of the natural soil and stabilized soils were as follows:

|  | Natural Soil | Stabilized Soil |
|---|---|---|
| Plasticity Index | 38.5% | 4-12%. |
| Unconfined compressive strength (28 days) | 700 p. s. i. | 1,850-2,000 p. s. i. |
| Volumetric shrinkage | 82.5% | 12.5-15%. |
| Capillary potential | 17 feet | 10.2-6.1 feet. |

A corresponding mixture was prepared comprising 90 parts of same A-7 soil, 10 parts fly ash, and 9 parts Portland cement. The plasticity index of this corresponding mixture was 28; thus the incorporation of Portland cement into the soil reduced the plasticity index from 38.5 only to 28, a value which is still considered unsatisfactory.

*Example 5*

Various samples were prepared and tested as in Examples 3 and 4, using an A-3 soil having a fineness modulus below 1.7. The proportions of ingredients by weight were as follows:

| Lime | Fly Ash | Soil (A-3) |
|---|---|---|
| 3 | 10 | 90 |
| 6 | 10 | 90 |
| 3 | 15 | 85 |
| 6 | 15 | 85 |
| 3 | 20 | 80 |
| 6 | 20 | 80 |

The resulting compositions show compressive strengths in the range of 400-600 p. s. i. after aging for 28 days, a marked improvement over the natural soil. The stabilized soils also showed ability satisfactorily to resist 12 cycles of alternate freezing and thawing or wetting and drying, while the sandy A-3 soil alone fails in the first cycle.

*Example 6*

An A-3 soil similar to that of Example 5 was stabilized by the formation of a mix consisting essentially by weight of 3 parts lime, 16 parts fly ash, and 84 parts A-3 soil. This stabilized soil had a compressive strength after aging 28 days of 450 p. s. i., and resisted 12 cycles of wetting and drying with a 3.5% weight loss on surface brushing.

*Example 7*

Ingredient: Parts by weight
Lime _____ 5
Fly ash _____ 10
A-2-4 soil (from Southern New Jersey) _____ 90

The stabilized soil had a 7-day compressive strength of 770 p. s. i., as compared to 175 p. s. i. for the natural soil.

The following examples represent specific combinations of particular advantage in connection with soils of different types. All the following examples represent highly useful stabilized soils having improved properties for highway construction as compared to the soil prior to stabilization.

*Example 8*

Parts by weight
A-4 soil _____ 84
Lime _____ 3
Fly ash _____ 16

*Example 9*

A-5 soil _____ 85
Lime _____ 6
Fly ash _____ 15

*Example 10*

A-6 soil _____ 88
Lime _____ 8
Fly ash _____ 12

*Example 11*

A-3 soil _____ 88
Lime _____ 2
Fly ash _____ 12

*Example 12*

A-3 soil _____ 70
Lime _____ 2
Fly ash _____ 30

*Example 13*

The following example illustrates advantageous compositions in accordance with this invention wherein the finely divided material is an artificial material equivalent to natural soil, and herein defined as soil, parts being by weight:

| Fine Material | Proportions | | |
|---|---|---|---|
|  | Fine Material | Lime | Fly Ash |
| Sand | 90 | 3 | 10 |
|  | 90 | 6 | 10 |
|  | 90 | 9 | 10 |
|  | 80 | 3 | 20 |
|  | 80 | 6 | 20 |
|  | 80 | 9 | 20 |
| Crushed limestone screenings (through 10 mesh, fineness modulus 1.5) | 90 | 3 | 10 |
|  | 90 | 6 | 10 |
|  | 90 | 9 | 10 |
|  | 80 | 3 | 20 |
|  | 80 | 6 | 20 |
|  | 80 | 9 | 20 |
| Pulverized blast furnace slag (fineness modulus 1.6) | 90 | 3 | 10 |
|  | 90 | 6 | 10 |
|  | 90 | 9 | 10 |
|  | 80 | 3 | 20 |
|  | 80 | 6 | 20 |
|  | 80 | 9 | 20 |
| Crushed trap rock (fineness modulus 1.5) | 90 | 3 | 10 |
|  | 90 | 6 | 10 |
|  | 90 | 9 | 10 |
|  | 80 | 3 | 20 |
|  | 80 | 6 | 20 |
|  | 80 | 9 | 20 |

All of the foregoing compositions of Example 13 have compressive strengths in the range of 400-600 p. s. i. after aging for 28 days, and show ability to resist about 12 cycles of alternate freezing and thawing or wetting and drying in accordance with conventional tests.

From the foregoing description and examples it will be appreciated that our lime-fly ash-soil compositions are novel generally and applicable to a wide variety of uses. They are of great advantage by reason of their relatively low cost, engineering properties and strength characteristics. The stabilized, uncured soil product is particularly advantageous in that considerable time (on the order of a week or more) elapses before the mixture sets up more or less completely. During this period the mix is readily handled, spread and compacted, and yet due to the immediate changes in soil properties which are produced, the compacted mixture has a surprisingly great load-bearing capacity during this period, even before complete setting. In our experience the load-bearing characteristic of this newly formed composition has been sufficient to permit the use of a road or highway, for example, before setting is complete. The addition of the lime and fly ash, in the proportions disclosed, immediately converts a natural soil which is relatively poor as a load-supporting base to a composition having structural characteristics ideally suited for the purpose.

The property of our compositions to set slowly is of prime importance in road and highway construction, in that constructions schedules need not necessarily be adhered to rigidly. Moreover, work may be discontinued or postponed due to rain and resumed at a later date without harm to the stabilized soil due to setting or erosion during the interventing period. By contrast, soils stabilized with Portland cement set up rapidly under such conditions.

Another advantage of our stabilized lime-fly ash-soil compositions is that they may be recompacted after several weeks, while soils treated with Portland cement are found to set up quickly and can not satisfactorily be recompacted several weeks after they are first compacted. Our material is also an ideal patching material, which is an additional advantage over Portland cement.

While lime alone or fly ash alone, when mixed with soil, may in certain cases improve certain characteristics of a soil, for use as a load-supporting base, the combination of lime with fly ash produces radically changed characteristics far beyond any results that might be predicted from the behavior of lime alone, or of fly ash alone. The beneficial effects achieved are far in excess of the sum of those attributable to the presence of either lime or fly ash.

Additional materials such as Portland cement, special grades of clay soils and alumino silicates and the like may be incorporated into soil stabilized in accordance with our invention without detrimental effect to certain of the advantages of the invention. However, the novel stabilized soil road bases themselves consist essentially of the ingredients set forth in the appended claims.

The above description and examples are presented as illustrations of preferred embodiments of the invention. All modifications and variations which conform to the spirit of the invention, including the substitution of equivalents and other changes in the particular form of the method and product, as well as the use of certain advantageous features of the invention without the use of other features, are within the scope of the invention as defined in the appended claims.

Having thus defined our invention, we claim:

1. A stabilized soil composition of matter consisting essentially by weight of about 10% to about 30% inclusive of crude fly ash, about 70% to about 90% inclusive of soil having a fineness modulus below 1.7, the sum of the percentages of crude fly ash plus soil being substantially equal to 100, and about 2% to about 9% inclusive of lime, the percent lime being based on the weight of crude fly ash plus soil.

2. A stabilized soil composition of matter consisting essentially by weight of about 15% to about 30% inclusive of crude fly ash, about 70% to about 85% inclusive of soil having a fineness modulus below 1.7, said soil comprising fine sand having substantially no binder content, at least 51% by weight of which passes a standard No. 40 sieve, and a maximum of 10% by weight of which passes a standard No. 200 sieve, the sum of the percentages of crude fly ash plus soil being substantially equal to 100, and about 2% to about 7% inclusive of lime, the percent lime being based on the weight of crude fly ash plush soil.

3. A stabilized soil composition of matter consisting essentially by weight of about 10% to about 20% inclusive of crude fly ash, about 80% to about 90% inclusive of soil having a fineness modulus below 1.7, said soil comprising a granular material selected from the group consisting of gravel and sand containing a plastic component which is selected from the group consisting of clay and silt, a maximum of 35% by weight of soil passing a standard No. 200 sieve, and that portion of the soil which passes a standard No. 40 sieve having a maximum liquid limit of 40 and having a maximum plasticity index of 10, the sum of the percentages of crude fly ash plus soil being substantially equal to 100, and about 2% to about 7% inclusive of lime, the percent lime being based on the weight of crude fly ash plus soil.

4. A stabilized soil composition of matter consisting essentially by weight of about 10% to about 20% inclusive of crude fly ash, about 80% to about 90% inclusive of soil having a fineness modulus below 1.7, said soil comprising a granular material selected from the group consisting of gravel and sand containing a plastic component which is selected from the group consisting of clay and silt, a maximum of 35% by weight of said soil passing a standard No. 200 sieve, that portion of said soil which passes a standard No. 40 sieve having a minimum liquid limit of 41 and having a maximum plasticity index of 10, the sum of the percentages of crude fly ash plus soil being substantially equal to 100, and about 2% to about 9% inclusive of lime, the percent lime being based on the weight of crude fly ash plus soil.

5. A stabilized soil composition of matter consisting essentially by weight of about 10% to about 20% inclusive of crude fly ash, about 80% to about 90% inclusive of soil selected from the group which consists of the silty and clayey soils having a fineness modulus below 1.7, at least 36% by weight of said soil passing a standard No. 200 sieve, the sum of the percentages of crude fly ash plus soil being substantially equal to 100, and about 3% to about 9% inclusive of lime, the percent lime being based on the weight of crude fly ash plus soil.

6. A stabilized soil composition of matter consisting essentially by weight of about 10% to about 20% inclusive of crude fly ash, about 80% to about 90% inclusive of soil selected from the group consisting of the clayey and silty soils having a fineness modulus below 1.7, that portion of said soil which passes a standard No. 40 sieve having a minimum plasticity index of 11, the sum of the percentages of crude fly ash plus soil being substantially equal to 100, and about 3% to about 9% inclusive of lime the percent lime being based on the weight of crude fly ash plus soil.

7. A stabilized compact load-supporting course for a road, highway or the like, characterized by strength sufficient to support heavy loads and pliability sufficient for recompacting, consisting essentially of about 10% to 30% by weight inclusive of crude fly ash, about 70% to about 90% by weight inclusive of soil having a fineness modulus below 1.7, the sum of the percentages of crude fly ash plus soil being substantially equal to 100, about 2% to about 9% by weight inclusive of lime, the percent lime being based on the weight of crude fly ash plus soil, and about 5% to about 32% by weight inclusive of water, the percent water being based on the total weight of lime, fly ash and soil.

References Cited in the file of this patent

UNITED STATES PATENTS

| Number | Name | Date |
|---|---|---|
| 254,342 | Leidholdt | Feb. 28, 1882 |
| 1,552,051 | Crume | Sept. 1, 1925 |
| 1,886,933 | Askenasy | Nov. 8, 1932 |
| 1,942,769 | Peffer et al. | Jan. 9, 1934 |
| 2,250,107 | Nelles | July 22, 1941 |
| 2,382,154 | Jones et al. | Aug. 14, 1945 |
| 2,564,690 | Havelin et al. | Aug. 21, 1951 |